Oct. 25, 1938.  K. R. GOHRE  2,134,605
APPARATUS AND PROCESS FOR MELTING OUT METALS FROM METALLIC DUST
Filed Aug. 24, 1937  3 Sheets-Sheet 1
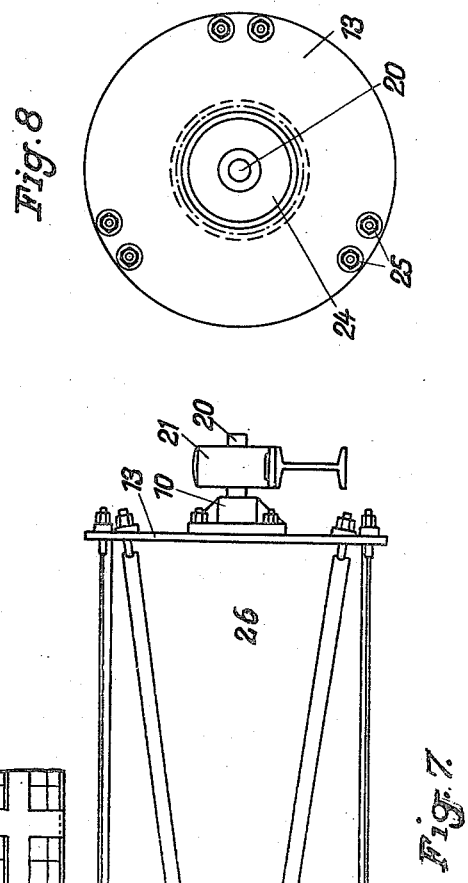
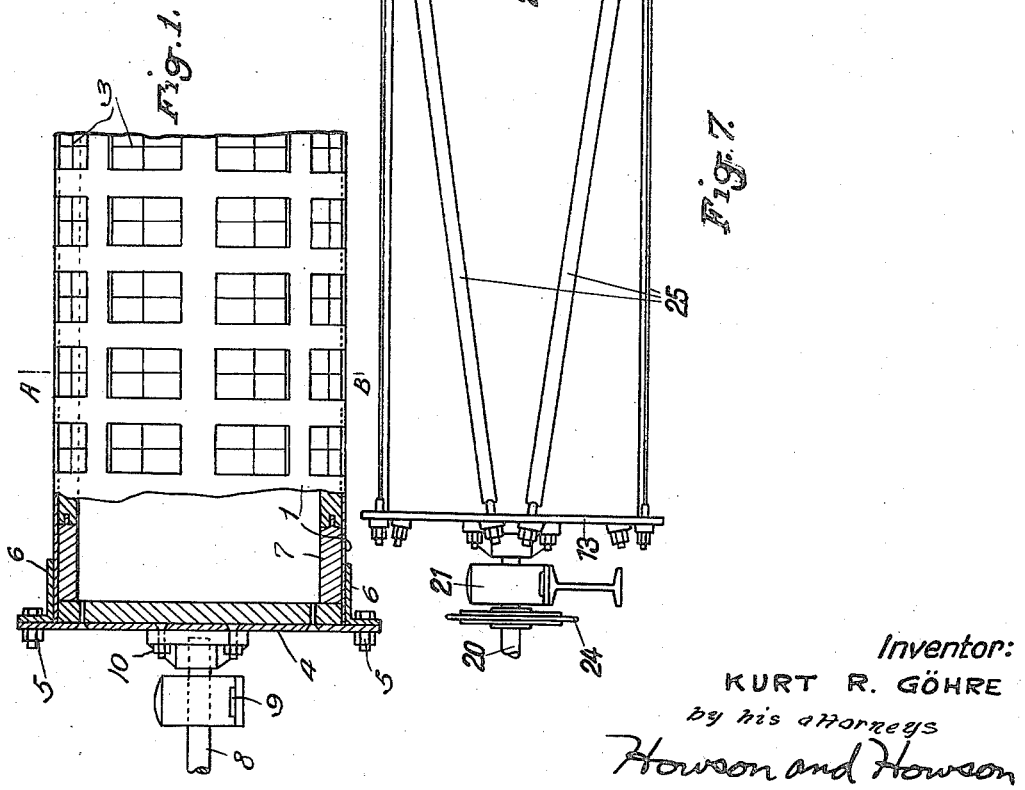
Inventor:
KURT R. GÖHRE
by his attorneys
Howson and Howson Oct. 25, 1938. K. R. GOHRE 2,134,605
APPARATUS AND PROCESS FOR MELTING OUT METALS FROM METALLIC DUST
Filed Aug. 24, 1937 3 Sheets-Sheet 2
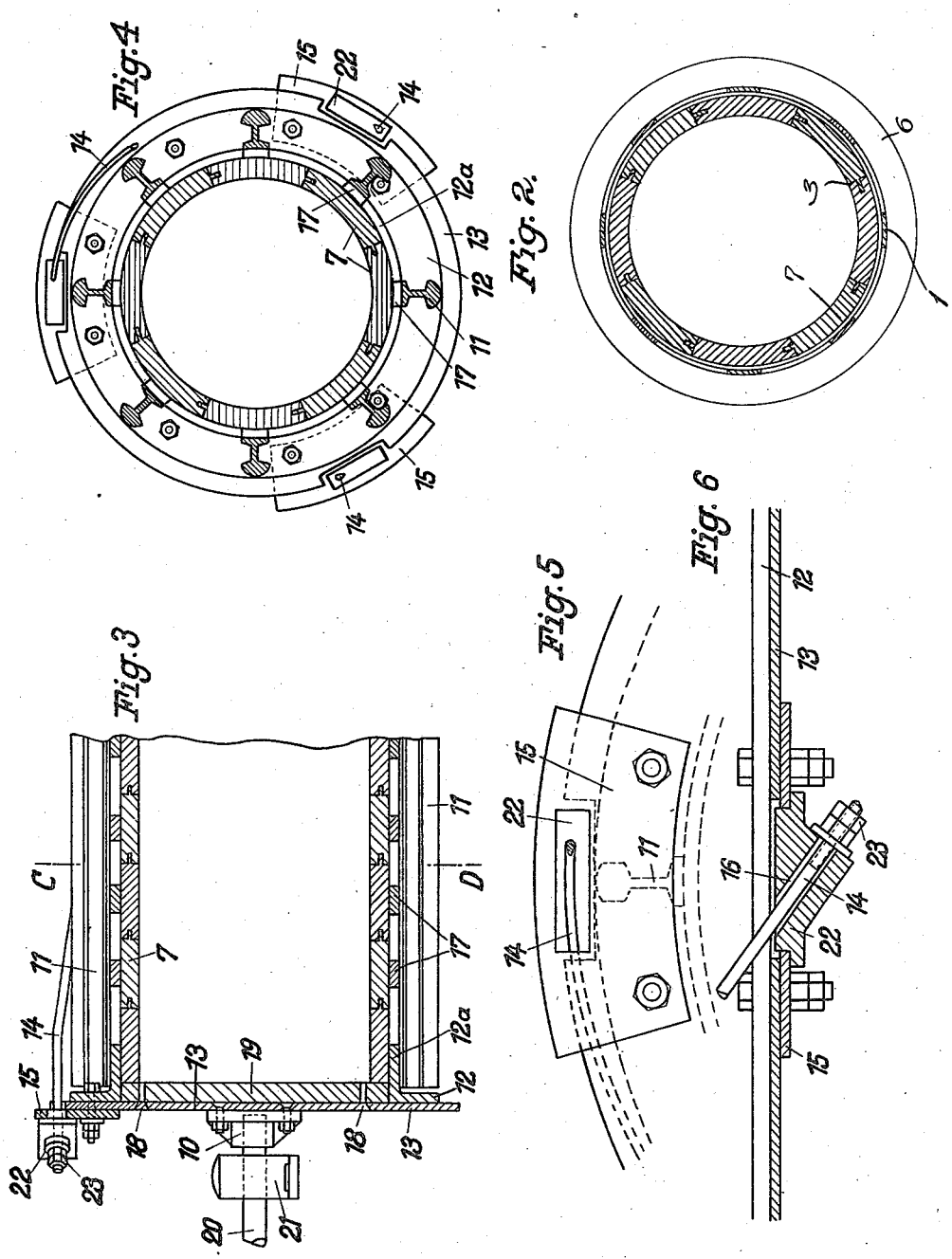
Inventor:
KURT R. GÖHRE
by his attorneys
Howson and Howson

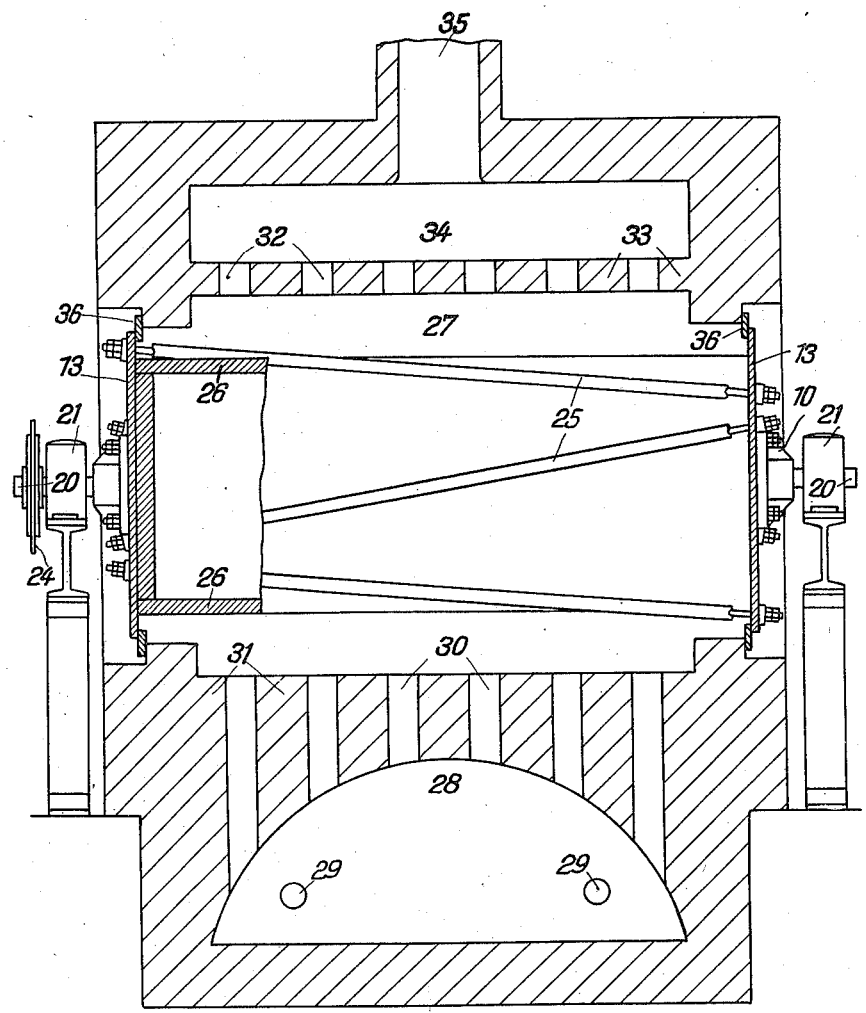

Patented Oct. 25, 1938

2,134,605

UNITED STATES PATENT OFFICE 2,134,605

APPARATUS AND PROCESS FOR MELTING OUT METALS FROM METALLIC DUST

Kurt R. Göhre, Frankfort-on-the-Main, Germany, assignor to American Lurgi Corporation, New York, N. Y., a corporation of New York Application August 24, 1937, Serial No. 160,711
In Germany September 19, 1936

18 Claims. (Cl. 263—34)

This invention relates to apparatus and process for melting out metals from metallic dust, scrapings, ashes, chips, filings, and the like, for example the recovery of reguline zinc from zinc dust, trass, and other materials containing zinc in more or less fine division, and more particularly to an externally heated rotary drum for this purpose, and the process employing the same.

Heretofore it has been proposed to melt zinc dust in a brick lined iron shell, but this proposal has met with difficulties, requiring frequent replacement or repair of the drum, as well as further refining of the metal melted therein. The molten zinc passed through joints in the brick work or penetrated through cracks in the lining and reached the inner side of the iron shell, from which it dissolved considerable quantities of iron, and the iron swelled by accretion from the formation of a hard alloy. Hence on the one hand the zinc was contaminated by the iron, and on the other hand, the alterations in the diameter of the lining and the thickness of the shell resulted in a short time in crushing the lining or cracking the iron shell.

It is therefore the main object of the present invention to avoid the disadvantages referred to above, and to construct and arrange and operate the refractory lining and metal supporting structure therefor of a melting drum of this character, to prevent the metal melted from coming in contact with the supporting structure to any material extent. This object is accomplished by preventing any conteminated leakage metal from returning to the molten metal, and/or by permitting such contaminated leakage metal to escape.

Other objects will be apparent from the following description and the accompanying drawings, in which—

Figure 1 is an elevation, partly in axial section, of a rotary drum having a metal shell with rectangular openings;

Figure 2 is a radial section along the line A—B of Figure 1;

Figure 3 is an axial section of a modification having longitudinal rails;

Figure 4 is a radial section along the line C—D of Figure 3;

Figure 5 is an enlarged end elevation of a portion of Figure 4, showing details thereof;

Figure 6 is a section through the detail shown in Figure 5;

Figure 7 is an elevation of a further modification, and

Figure 8 is an end elevation of the modification shown in Figure 7.

Figure 9 is a vertical section of an oven, adapted for heating the rotary drum.

According to the present invention the disadvantages hereinbefore recited are overcome by the use of a perforated shell or openwork supporting structure for the rotary drum, and/or by the use of a monolithic refractory lining or a lining built up of refractory units fitted together with leak resisting joints, such as tongue and groove. The supporting structure may for example be a shell of expanded metal, or provided with openings of like or unlike shape and/or size which may be provided in regular or irregular spacing in the drum shell. Or a gridwork may be employed, consisting of metal strips, rails, rods, tubes, or similar elongated bodies extending in the form of ties or struts, parallel or oblique to the axis of the drum. These may cross each other, with recesses provided in one or both at the points of intersection, so that the crossing elements may be interfitted or mortised one into the other.

With these arrangements, if the molten metal leaks through cracks or joints in the lining, it cannot remain in contact with the metal parts of the drum, but instead drips off. This enables the lining to fulfil its purpose of preventing contact of the metal being melted with the metal of the support for the lining.

The lining may be constituted by a single monolithic tube of silicon carbide or similar refractory materials, as it is possible to manufacture these with a diameter of one meter and two or three meters long or even greater dimensions. Such tubes have performed excellently in practical operation, and have recovered metals for example zinc containing so little iron as to require no further refining. As there are no joints, and as the tube itself has considerable strength, the supporting structure may be very simple because no openings in the supporting structure are necessary for either access or the dripping off of molten leakage metal, and the supporting structure need only hold the tube in place and interfere as little as possible with the heat transfer to the walls of the tube. A metal cylinder closed on all sides can be used if of sufficient thickness and heat conductivity.

The metal supporting structure is preferably arranged to have the openings or spacing so formed and disposed as to leave the greatest possible number of joints free and uncovered, which in addition to further avoiding contact of the molten metal with the supporting metal facilitates access to the joints for re-calking from the outside. When the metal supporting structure is built up of rails or other elongated elements, these are preferably held together at their ends by flanges of the end disks or angle iron rings, with intermediate spacers therebetween, interposed between the elongated elements and the lining, for example polygonal or round plates welded to the inner sides of the elongated elements. Outside of the elongated elements one or more tie rods may be provided, such as a cable wound thereon helically.

Referring to Figure 1, the supporting structure comprises a metal shell 1. The lining of the rotary drum consists of a plurality of shaped sections 7, preferably of equal size, and of tongue and groove construction at their mating edges to provide interfitting leak resisting joints 3. Of course this lining can be made in one piece such as a stamping, or it can be otherwise sub-divided such as being composed of rings. The openings in the drum shell 1 are so disposed as to leave exposed the meeting point of four shaped sections 7. Thus the portions of the shell which are not cut away will cover only comparatively short portions of the joints 3.

At each end of the drum a ring 6 of rolled section is placed around the drum shell, to which the cover 4 can be bolted. Each end wall or cover 4 consists of a metal disk and a refractory lining therefor, which may be either of one piece or composed of a plurality of shaped sections. The durm is supported at each end for rotation by trunnions 8 journaled in bearings 9 and connected to its cover 4 by a bracket 10.

In the modified form shown in Figures 3 to 6 the same forms of lining may be employed, around which a considerable number of rails 11 are placed, parallel to the longitudinal axis of the drum. The ends of the rails are held by a ring, such as the angle ring 12 in which the rails lie against the cylindrical flange thereof. Between the rails and the lining are mounted the intermediate members 17 spaced so as to leave the joints 3 uncovered. The members 17 are for example so welded to the rails 11 that each brick of the lining is held by one or more of these members 17. In the region of the joints which run circumferentially sheet metal may be placed so as to insure the immediate slipping off of any molten zinc leakage. The refractory lining can here again consist of one single tube, or several adjoining rings. The cover 13 with its lining 19 is bolted to the ring 12 and carries the usual trunnion 20. The bearings 21 for the trunnions and the oven for heating the drum can be of usual construction.

On the outer rim of the cover there are provided one or more plates 15 with blocks 22 which are bolted or otherwise secured to the covers and the ring 12. Each block has a slot or through hole 16 for the tie rod 14, which may be a cable or flexible rod surrounding the rails 11 in helical coils. The nuts 23 or other equivalent devices serve to tighten the tie rods 14. The arrangement may be such that tightening is possible during operation. For this purpose, springs placed in caps or hoods can also be used. The covers are not ordinarily in the fire, so that the nuts or spring caps are not exposed to the danger of premature destruction.

In one or both covers of the drum there are provided holes 18, through which the gases can escape from the drum, and which can also serve for the drawing off of metals or other molten substances. These holes can be constantly open, so that when they pass through the lowest part of their course, the molten substances can flow out into a channel placed in front of the oven; or else drawing off may be done from time to time, on which occasions the drum can be stopped.

It is advantageous to provide an opening in one of the drum covers for the charging and emptying of the drum. However, such opening as well as the holes 18 can be placed in the drum shell or in both parts.

The lining of the drum can be of the usual refractories, as fire clay, silica, magnesite, dolomite, and the like, or it may be composed of silicon carbide, graphite etc. If shaped sections are used for making the lining, it is preferable to calk the joints between the shaped sections and other constructional parts of the drum lining with fusible cement which softens at a somewhat higher temperature than the working temperature of the oven. Corrosion resisting metals can also be selected as construction material. The lining can also be made by stamping. The supporting framework preferably consists of iron or steel, but other metals such as copper and copper alloys can be used.

In the form shown in Figures 7 and 8 the refractory lining consists for example of a single piece of tube 26, which may be composed of silicon carbide or other heat- and corrosion-resisting material. The drum cover 13, the two trunnions 20, their fastenings to the cover 13, their bearings 21, and the drive 24 can be of the types previously described. The supporting metal structure consists of obliquely disposed ties 25 connected to the covers for example by screw connections. The arrangements for charging and emptying etc. can be as previously described. This construction is particularly reliable in operation, since the number of joints in the complete lining is reduced to a minimum. In the matter of heat economy there is the advantage that the fire gases everywhere come into direct contact with the lining. At the same time such drums can be constructed without difficulty up to sizes two meters long by one meter in diameter and even larger.

As shown on Fig. 9 the drum is advantageously heated in such a manner that it is placed inside the heating chamber 27. The heating gases after having been produced at the necessary temperature in the combustion chamber 28, e. g. by means of burner 29, flow through the ducts 30 of the vault 31 into the heating chamber 27, surrounding there the shell of the drum in order to pass then through the ducts 32 of the upper vault into the collecting chamber 34 which they leave, e. g., through the stack 35. When smelting zinc or zinc dust or the like the heating gases enter the heating chamber with a temperature of between 600 and 800° C. When leaving the heating chamber their temperatures range from 420 to 550° C. The covers 13 of the drum are situated outside the heating chamber. 36 is a seal consisting e. g. of steel rings in parts.

In the operation of any of the described forms for the treatment of zinc dust for example, which should preferably be dry, the drum is first completely filled with the zinc dust through the charging opening. The charged material rapidly comes to a rather high temperature. During this heating considerable quantities of gas may escape through the holes 18, especially when the zinc dust contains small quantities of moisture, in which event it is preferable to leave the charging opening also open for a while.

After the charging opening is closed, the drum can be set in rotation, and after the evolution of gases is at an end, the holes 18 can be fully or partly closed. Sometime after all of the holes are closed, the first drawing off of zinc can be done. Further quantities of zinc dust can be added at this time, or from time to time.

When practically all of the metal has been melted out of the zinc dust, the drum is stopped and the residues which are chiefly in the nature of oxides can be removed from the drum.

The molten zinc can also be left in the drum until the end of the treatment of the charge and not drawn off until just before the clearing out of the drum. The extraction of zinc is in all cases very complete, amounting for example to from 90 to 95%, upon a zinc dust containing 92% zinc. The treatment of a charge takes from six to eight hours for a drum capacity of two to four tons.

As further advantages of the invention may be cited the shorter charge treatment period and the saving of fuel resulting from the fact that the fire gases come into direct contact with the lining, whereby better heat transmission is obtained. For the same reason the working temperature can be kept lower than in the case of drums with a full walled shell, without lengthening the treatment period. Thereby the construction materials are subjected to less severe usage.

Since the rings (Figs. 1 to 6) which are placed on both ends of the drum shell remain comparatively cool, the drum shell, especially when composed of rails or similar elongated bodies, draws only slightly away from the outer limiting surface of the lining. The lining therefore is held rather firmly in the shell, and therefrom results the further advantage that operation can if required be conducted at a higher temperature than has heretofore been possible, since the differing coefficients of heat expansion of the individual construction materials in the drum are, according to the invention, for the most part compensated.

The invention is not limited to the precise details disclosed, but instead embraces such embodiments of the broad idea as fall within the scope of the following claims.

What I claim is:

1. In a muffle furnace, an externally heated rotary drum comprising a lining of refractory construction material and a metal supporting structure on the outside thereof in combination with a stationary housing, means for supporting said drum for rotation in said housing, and means for conducting heating gases through said housing and about the outside of said drum, said metal supporting structure being of open construction to permit said heating gases to directly contact said refractory lining.

2. In a muffle furnace, an externally heated rotary drum comprising a tube of silicon carbide inclosed in a thin metal shell in combination with a stationary housing, means for supporting said drum for rotation in said housing, and means for conducting heating gases through said housing and about the outside of said drum.

3. In a muffle furnace, an externally heated rotary drum comprising a lining of jointed pieces of ceramic material, and a metal supporting structure of open construction outside thereof in combination with a stationary housing, means for supporting said drum for rotation in said housing, and means for conducting heating gases through said housing and about the outside of said drum, the openings in the metal supporting structure being disposed to leave the greater part of the joints of the lining free and unobstructed, said open construction permitting said heating gases to directly contact said ceramic lining.

4. In a muffle furnace, an externally heated rotary drum comprising a lining of ceramic material of cylindrical form having a removable end wall forming a cover, and a metal supporting structure outside of said lining having threaded connecting means to permit removal of said cover in combination with a stationary housing, means for supporting said drum for rotation in said housing, and means for conducting heating gases through said housing and about the outside of said drum.

5. In a muffle furnace, an externally heated rotary drum comprising a lining of refractory construction material and a metal supporting structure outside thereof formed of metal strips crossing each other in combination with a stationary housing, means for supporting said drum for rotation in said housing, and means for conducting heating gases through said housing and about the outside of said drum.

6. In a muffle furnace, an externally heated rotary drum comprising a lining of ceramic material of cylindrical form having a removable end wall, and a metallic supporting structure comprising annular flanges at the ends of said cylindrical form and elongated metal bodies extending therebetween outside of said cylindrical form in combination with a stationary housing, means for supporting said drum for rotation in said housing, and means for conducting heating gases through said housing and about the outside of said drum.

7. In a muffle furnace, an externally heated rotary drum comprising a lining of ceramic material of cylindrical form having a removable end wall, and a metallic supporting structure comprising annular flanges at the ends of said cylindrical form and elongated metal bodies extending therebetween outside of said cylindrical form, said lining being constructed of joined ceramic pieces, and said supporting structure including intermediate pieces between said elongated metal bodies and said lining and spaced apart to expose the joints of the lining in combination with a stationary housing, means for supporting said drum for rotation in said housing, and means for conducting heating gases through said housing and about the outside of said drum.

8. In a muffle furnace, an externally heated rotary drum comprising a lining of ceramic material of cylindrical form having a removable end wall, and a metallic supporting structure comprising annular flanges at the ends of said cylindrical form and elongated metal bodies extending therebetween outside of said cylindrical form and a tie rod wound helically outside of said elongated bodies in combination with a stationary housing, means for supporting said drum for rotation in said housing, and means for conducting heating gases through said housing and about the outside of said drum.

9. Apparatus for melting out metal from dust containing the same, comprising a lining of ceramic material adapted to receive a charge of the metal dust to be melted, and a metallic support for said charged lining, said support and lining being externally swept by heating gases at a temperature above the melting point of the metal dust while being rotated as a unit, the metallic support being constructed and arranged to permit said heating gases to directly contact said lining and to prevent contamination of the charge inside the lining by the metal of the support.

10. Apparatus for melting out metal from dust containing the same, comprising a lining of ceramic material adapted to receive a charge of the metal dust to be melted, and a metallic support for said charged lining, said support and lining being externally swept by heating gases at a temperature above the melting point of the metal dust while being rotated as a unit, the metallic support being constructed and arranged to permit said heating gases to directly contact said lining and to permit the escape of any molten metal leaking through the ceramic lining and thereby prevent contamination of the charge inside the lining by the metal of the support.

11. In apparatus for melting out metals from dust containing the same, a drum comprising a refractory lining and a metal supporting structure therefor arranged externally thereof, and means for mounting said drum for rotation and for being externally swept by heating gases, said lining being in the shape of a hollow right cylinder and constructed and arranged to resist leakage of molten metal therethrough, said metal supporting structure being constructed and arranged to permit said heating gases to directly contact said lining and to facilitate escape of any molten metal leaking through said lining.

12. Process for melting out metal from dust containing the same, comprising charging the metal dust into a rotary drum having a ceramic lining, a cover having a charging opening, and a metal supporting structure, externally heating said drum while rotating the same, preventing contamination of said charge by the metal of said supporting structure, permitting gases produced during the initial heating to escape through openings in the cover of the drum and thereafter closing said escape openings, and drawing off the metal through the charging opening in the cover of the drum.

13. Process for melting out zinc from material containing zinc in metallic form and other substances comprising charging the said material into a rotary drum having a ceramic lining, a cover having a charging opening, and a metal supporting structure, externally heating said drum while rotating the same, preventing contamination of the molten zinc by the metal of said supporting structure, permitting gases produced during the initial heating to escape through openings in the cover of the drum and thereafter closing said escape openings, and drawing off the zinc through the charging opening in the cover of the drum.

14. Muffle furnace, consisting of a fixed furnace housing, of means for conducting the heating gases through the furnace housing, and of a rotating muffle mounted in the furnace housing and surrounded by a metal shell, said metal shell having openings therein constructed and arranged to permit said heating gases to directly contact said rotating muffle and to observe leakages of said muffle.

15. Process for melting out metal from dust containing the same, comprising charging the metal dust into a ceramic vessel, rotating said ceramic vessel, subjecting said ceramic vessel to direct external contact with gases of combustion and thereby indirectly heating the dust therewithin while rotating said ceramic vessel, venting said rotating ceramic vessel to permit escape of gases produced therein during initial heating and rotation, sealing said ceramic vessel after the generation of gases therewithin has subsided and thereafter separately drawing off the molten metal from said ceramic vessel.

16. In a muffle furnace, consisting of a fixed furnace housing, of means for conducting heating gases through said housing, and of a ceramic rotating muffle mounted in said furnace housing and provided with a supporting structure, instead of a metal shell surrounding said rotating muffle an anchoring covering only a part of the outer surface of said muffle and adapted to support said ceramic muffle and to permit said heating gases to directly contact said ceramic muffle.

17. In a muffle furnace as claimed in claim 16 the arrangement of said rotating muffle in said muffle furnace in such a manner, that the covers of the muffle are situated outside of said furnace.

18. In a muffle furnace as claimed in claim 16 openings in at least one cover of said muffle adapted to permit the escape of gases produced therein and means for closing said openings.

KURT R. GÖHRE.